(12) United States Patent
Luo et al.

(10) Patent No.: US 12,198,229 B2
(45) Date of Patent: Jan. 14, 2025

(54) DEEP PALETTE PREDICTION

(71) Applicant: GOOGLE LLC, Mountain View, CA (US)

(72) Inventors: Xiyang Luo, Mountain View, CA (US); Innfarn Yoo, Mountain View, CA (US); Feng Yang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 305 days.

(21) Appl. No.: 17/782,727

(22) PCT Filed: Jan. 8, 2020

(86) PCT No.: PCT/US2020/012795
§ 371 (c)(1),
(2) Date: Jun. 6, 2022

(87) PCT Pub. No.: WO2021/141580
PCT Pub. Date: Jul. 15, 2021

(65) Prior Publication Data
US 2023/0053317 A1 Feb. 16, 2023

(51) Int. Cl.
*G06T 11/00* (2006.01)
*G06T 7/90* (2017.01)
(Continued)

(52) U.S. Cl.
CPC .............. *G06T 11/001* (2013.01); *G06T 7/90* (2017.01); *G06T 9/00* (2013.01); *G06V 10/28* (2022.01);
(Continued)

(58) Field of Classification Search
CPC ............ G06T 11/001; G06T 7/90; G06T 9/00
See application file for complete search history.

(56) References Cited

U.S. PATENT DOCUMENTS

| | | | |
|---|---|---|---|
| 2006/0120596 A1* | 6/2006 | Chien | ................... G06T 9/002 348/E9.04 |
| 2009/0010533 A1* | 1/2009 | Hung | .................... H04N 19/44 382/166 |
| 2018/0114108 A1* | 4/2018 | Lao | ........................ G06N 3/044 |

(Continued)

OTHER PUBLICATIONS

Maria Shugrina et al., "Color Sails: Discrete-Continuous Palettes for Deep Color Exploration," arXiv:1806.02918v1, Jun. 7, 2018.
(Continued)

*Primary Examiner* — Edward Park
(74) *Attorney, Agent, or Firm* — MCDONNELL BOEHNEN HULBERT & BERGHOFF LLP

(57) ABSTRACT

Example embodiments allow for training of encoders (e.g., artificial neural networks (ANNs)) to generate a color palette based on an input image. The color palette can then be used to generate, using the input image, a quantized, reduced color depth image that corresponds to the input image. Differences between a plurality of such input images and corresponding quantized images are used to train the encoder. Encoders trained in this manner are especially suited for generating color palettes used to convert images into different reduced color depth image file formats. Such an encoder also has benefits, with respect to memory use and computational time or cost, relative to the median-cut algorithm or other methods for producing reduced color depth color palettes for images.

19 Claims, 4 Drawing Sheets

(51) Int. Cl.
  *G06T 9/00* (2006.01)
  *G06V 10/28* (2022.01)
  *G06V 10/56* (2022.01)
  *G06V 10/74* (2022.01)
  *G06V 10/82* (2022.01)

(52) U.S. Cl.
  CPC ............ *G06V 10/56* (2022.01); *G06V 10/761* (2022.01); *G06V 10/82* (2022.01); *G06T 2207/10024* (2013.01)

(56) References Cited

U.S. PATENT DOCUMENTS

| | | | | |
|---|---|---|---|---|
| 2020/0160547 | A1* | 5/2020 | Liu | G06V 20/588 |
| 2020/0302239 | A1* | 9/2020 | Wang | G06V 30/274 |
| 2020/0342328 | A1* | 10/2020 | Revaud | G06F 18/22 |
| 2021/0012503 | A1* | 1/2021 | Cho | G06F 18/24 |
| 2023/0053317 | A1* | 2/2023 | Luo | G06T 11/001 |

OTHER PUBLICATIONS

Nick Johnston and David Minnen, "Image Compression with Neural Networks," Google AI Blog, Sep. 29, 2016.

The International Search Report (ISR) with Written Opinion for PCT/US2020/012795 dated Oct. 5, 2020, pp. 1-15.

Chang C-H et al. "New Adaptive Color Quantization Method Based on Self-Organizing Maps" IEEE Transactions on Neural Networks (2005) vol. 16, No. 1, pp. 237-249.

Sudha N. "An ASIC implementation of Kohonen's map based colour image compression" Real-Time Imaging (2004) vol. 10. No. 1, pp. 31-39.

Dekker Luc et al. "Kohonen neural networks for optimal colour quantization" Network: Computation in Neural Systems (1994) vol. 5, No. 3, pp. 351-367.

Brun, Luc et al. "Color quantization" In: "Digital Color Imaging Handbook, Chapter 9", Jan. 1, 2003 (Jan. 1, 2003), CRC Press, XP055199557.

* cited by examiner

DEEP PALETTE PREDICTION

This application is a U.S. National Phase of International Application No. PCT/US2020/012795, filed Jan. 8, 2022, which is incorporated by reference herein in its entirety.

BACKGROUND

Different image formats may have different numbers of distinct colors they can support, which may be represented by how many bits they use to represent each pixel. For example, the Portable Network Graphics (PNG) format can store colors represented by 8, 24, or 48 bits per pixel, while the Graphics Interchange Format (GIF) supports 8 or fewer bits per pixel (a maximum of 256 colors in the palette). Thus, when an image file is converted to a format with a smaller color range, a new color palette may be generated for the image. This can be a slow process for large images and can lower the perceptual quality of the image.

SUMMARY

In order to convert an image file from one format to another, a new color palette may be generated. This is because some image formats limit the number of colors represented in the image in order to reduce the number of bits per pixel used to store the color data of the image. For example, the Portable Network Graphics (PNG) format can represent pixel color data with 8, 24, or 48 bits per pixel, while the Graphics Interchange Format (GIF) uses 8 or fewer bits per pixel to represent color information.

This conversion between formats can be a slow process, especially for image files that encode many pixels, that have a very deep color depth, or that are otherwise large in size. Additionally, converting to a format with a lower number of colors, or color depth, can cause a loss in the subjective quality of the image.

In order to efficiently reduce the number of colors represented in an image, it can be beneficial to identify a set of colors for a reduced color palette. The identity (e.g., the relative levels of red, blue, and green) of each of the colors in such a reduced color palette may be selected to preserve image quality and/or to minimize the reduction in image quality caused by reducing the number of colors in the image. In some examples, the colors in such a reduced color palette may be pre-selected, e.g., defined according to an image compression standard. Alternatively, the reduced color palette used to generate a reduced color-number image may be determined based on an input image so as to increase the quality of the output image. For example, an input image that includes mostly red hues could be represented by a color palette that contains mostly red or near-red colors, with relatively few colors of blue, green, or otherwise non-red hue, so as to efficiently generate an output image that is aesthetically satisfactory (e.g., subjectively pleasant to the average viewer).

A variety of methods could be applied to determine, for an input image, a color palette that will result in a subjectively pleasant or otherwise 'good' output image with pixels restricted to representation by colors in the determined color palette. One example of such a method is the median-cut algorithm, which is part of the GIF standard for compressing images.

Embodiments described herein provide methods for applying artificial neural networks (ANN), k-means, or other machine learning algorithms and/or encoders to generate a color palette to compress an image and/or to convert the image from one format to another. The ANN or other algorithm used to generate a color palette from an input image can be trained or otherwise developed according to a variety of processes. The present disclosure provides methods for training an encoder that may include an artificial neural network to generate a predicted color palette based on an input image. The generated color palette contains color values that can then be used to convert the applied image into an image that contains fewer colors than the applied input image. Differences between the reduced color image and the input image can then be used to train the ANN (e.g., by using the differences as an error signal to update the ANN via back propagation). The subjective quality of the generated image can additionally or alternatively be used to train the ANN.

Such an update process could be performed a plurality of times, and/or based on a plurality of different training images, to generate an ANN. Such a trained ANN can then be used (e.g., by a processor of a computer) to determine color palettes for additional images, which can then be used to convert the additional images into a different image format than their original image format.

The methods disclosed herein can beneficially enable a training set of images to be used to train a color palette-predicting artificial neural network or other algorithm without requiring information about a "ground truth" color palette for any of the images of the training set. Accordingly, images for such a training set may be obtained from any suitable source of images without requiring "ground truth" reduced color-number color palettes to be determined or otherwise obtained therefor.

In a first aspect, a method for training an encoder to generate a color palette from an input image includes: (i) obtaining training data, wherein the training data comprises one or more images, wherein each of the one or more images has a plurality of color channels; (ii) applying a first image from the training data to an encoder to generate a first palette for the first image, wherein the first palette comprises a first number of colors, each color of the first palette comprising a set of values that correspond to respective color channels of the first image; (iii) quantizing the first image using the first palette to generate a first quantized image; (iv) comparing the first image to the first quantized image; and (v) updating the encoder based on the comparison. Updating the encoder based on the comparison can include, for example, updating the encoder to reduce a difference between the first image and the first quantized image.

The above method may include one or more of the following optional features. The first image from the training data may be an RGB image that has a red color channel, a blue color channel, and a green color channel. The first image may be modified through data augmentation before being applied to the encoder. The encoder may comprise one or more convolutional layers and one or more output layers, wherein at least one of the output layers receives, as an input, an output of at least one of the convolutional layers, wherein applying the first image to the encoder to generate the first palette comprises applying the first image to at least one of the convolutional layers, wherein a final layer of the one or more output layers includes a first number of output units, and wherein each output unit of the final layer corresponds to a respective color of the first palette. One or more of such output layers could be referred to as "hidden layers."

The above method may further comprise: (i) generating a reduced-palette encoder by modifying the updated encoder, wherein modifying the updated encoder comprises: (a) discarding, from the updated encoder, at least the final layer; and (b) replacing the discarded final layer with a reduced-palette final layer, wherein the reduced-palette final layer includes a second number of output units, wherein the second number of output units is less than the first number of output units; (ii) applying a second image from the training data to the reduced-palette encoder to generate a second palette for the second image, wherein the second palette comprises a second number of colors, each color of the second palette comprising a set of values that correspond to respective color channels of the second image, wherein the second number of colors is less than the first number of colors, and wherein each output unit of the reduced-palette final layer corresponds to a respective color of the second palette; (iii) quantizing the second image using the second palette to generate a second quantized image; (iv) comparing the second image to the second quantized image; and (v) updating the reduced-palette encoder based on the comparison of the second image to the second quantized image. The first number of colors may be greater than 255 and the second number of colors may be less than 65. Updating the reduced-palette encoder based on the comparison can include, for example, updating the reduced-palette encoder to reduce a difference between the second image and the second quantized image.

Updating the reduced-palette encoder may comprise updating at least one parameter of the reduced-palette final layer. Updating the reduced-palette encoder may also comprise not modifying any parameter of the one or more convolutional layers. Not modifying any parameter of the one or more convolutional layers could include fixing the one or more convolutional layers and/or parameters thereof, e.g., by setting a learning rate parameter for the convolutional layers to zero, by setting a flag to indicate that the convolutional layers could be fixed or otherwise not updated, or by taking some other action.

Comparing the first image to the first quantized image may comprise determining a difference between a particular pixel of the first input image and a corresponding pixel of the first quantized image. Comparing the first image to the first quantized image may comprise applying a convolutional neural network to the first quantized image to generate a subjective quality score; an example of this would be using the Neural Image Assessment (NIMA) score. The encoder may be differentiable end-to-end and thus updating the encoder may comprise performing backpropagation through the encoder. Comparing the first image to the first quantized image may comprise performing a comparison process that is differentiable end-to-end and thus updating the encoder may comprise performing backpropagation through the comparison process.

In a further aspect, a method for predicting a color palette for an image includes: (i) obtaining an image; (ii) applying the image to an encoder to generate, for the image, at least on palette, wherein the encoder has been trained according to the method of the previous aspects. The image may be a RGB image file.

In another aspect a system includes a controller and a computer-readable medium having stored thereon program instructions that, upon execution by the controller, cause the controller to perform the any of the above methods. Such a computer-readable medium can be non-transitory.

In another aspect a system includes a computer-readable medium having stored thereon program instructions that, upon execution by the controller, cause the controller to perform the any of the above methods. Such a computer-readable medium can be non-transitory and can be incorporated into an article of manufacture.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
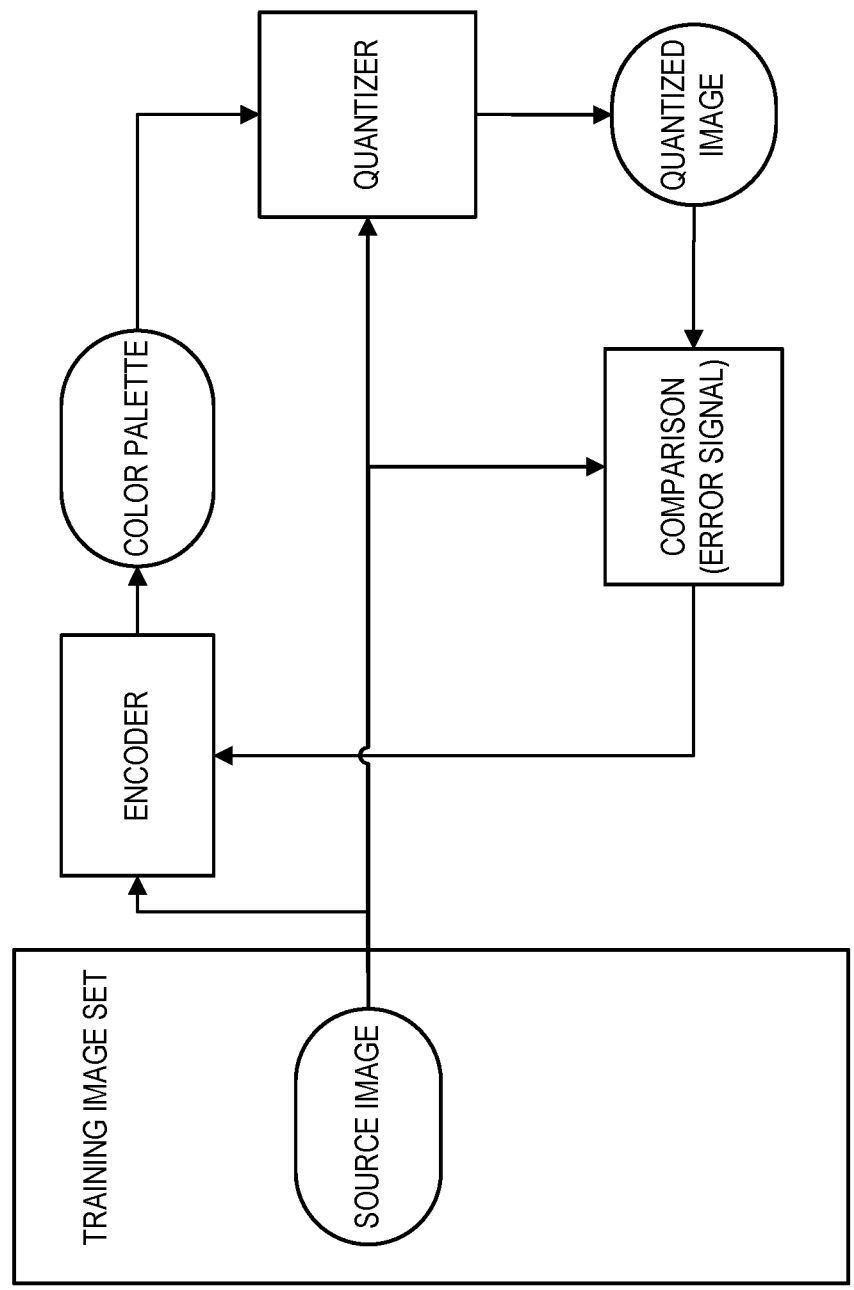
FIG. 1 illustrates an example method.

Examples of methods and systems are described herein. It should be understood that the words "exemplary," "example," and "illustrative," are used herein to mean "serving as an example, instance, or illustration." Any embodiment or feature described herein as "exemplary," "example," or "illustrative," is not necessarily to be construed as preferred or advantageous over other embodiments or features. Further, the exemplary embodiments described herein are not meant to be limiting. It will be readily understood that certain aspects of the disclosed systems and methods can be arranged and combined in a wide variety of different configurations.

I. Example Applications & Image Format Conversion

Generally, imaging may refer to capturing and storing the color and brightness characteristics of a real-world environment or scene in a digital, chemical, or other format (e.g., in photographs and/or motion video). A large variety of image capture devices exist (e.g. CCDs, photodetector arrays, active pixel sensors) to facilitate capturing images in a host of different formats (e.g., color imaging, black and white imaging).

Different image formats have different numbers of distinct colors they can support. This may be related to how many bits are used to represent each pixel. For example, the Portable Network Graphics (PNG) format can store colors represented by 8, 24, or 48 bits per pixel, while the Graphics Interchange Format (GIF) supports only 8 bits per pixel. Thus, if an image is converted from one format to another, the color data may be converted so as to be supported by the new format. The format of an image file may be changed for website image embedding, file compression, or file transfer, or other reasons. This conversion can be a slow process, especially for large image files. Additionally, the conversion can lead to a loss in perceptual quality of the image. It can be advantageous in a variety of applications to speed up the process of image format converting while maintaining the perceptual quality of the original image. One solution is to develop artificial neural networks (ANN) or other algorithms to generate a predicted color palette from an image. This predicted color palette could then be used to generate the image in the specified file format.

II. Example Color Palette Prediction

In order to generate, from an input image, an image that includes fewer colors than the input image, a reduced color palette may first be obtained. Each pixel of the input image can then be mapped to one of the colors in the palette based on the color of the pixel in the input image. Such a palette may be obtained as a default color palette, e.g., a target image format could specify a default color palette that must be used when encoding an image according to the target image format. Alternatively, the color palette may be determined based on the input image. In such examples, the determined color palette may be adapted to the colors present in the input image, such that the subjective quality of the encoded image is increased while representing the image using the specified number of colors in the color palette. A variety of methods may be used to determine a color palette from an input image. One such method is the median-cut algorithm.

The Median-cut algorithm is employed to convert images into the GIF image format. The median-cut algorithm includes sorting the color values of the pixels of the input image with respect to the color channel that exhibits the greatest range of values amongst the pixels. For example, if the blue channel has the greatest range in a RGB image, the color values would be first sorted according to the blue value. The sorted pixels are then divided into two sets or "buckets." This process of sorting and division is then repeated in each "bucket" until there is are as many "buckets" as the desired amount of colors for the palette. For each bucket, the color channel used to sort the pixels in the bucket is selected according to which color channel exhibits the greatest range of values amongst the pixels in the bucket. Then the color values of each "bucket" are averaged into a single color value for the bucket. This results in determining a number of colors for the output color palette that is equal to the number of buckets.

While straightforward, this process can be computationally expensive when used to determine large color palettes; the larger the color palette, the longer the process takes. Additionally, averaging the colors within a bucket does not always accurately reflect the range of colors within the bucket well, leading to a loss in subjective quality in the output image. Further, the median-cut algorithm is iterative and includes multiple sorting and partitioning steps, and so may require significant and variable memory, time/cycles to compute, and other computational resources, especially for large images and/or for output color palettes having many colors.

The embodiments provided herein represent an improvement for the median-cut algorithm and other methods previously employed to determine color palettes for encoding reduced-color depth images. These embodiments employ various machine learning techniques or other algorithms to identify improved color palettes that may correct discoloration, effectively predict a color palette for an image in a more constrained period of time, or provide other benefits. Embodiments described in the present disclosure avoid the iterative processing steps that are required by the median-cut algorithm (or similar algorithms), and therefore allow a color palette to be determined more quickly than is possible using the median-cut algorithm. Furthermore, experiments have shown that reduced-color depth images created in accordance with the present disclosure have a higher quality than those generated using the median-cut algorithm.

In some examples, an artificial neural network (ANN) can be applied to generate a color palette for an image. Such an ANN could be configured in a variety of ways. For example, the ANN could include two or more layers, could include units having linear, logarithmic, or otherwise-specified output functions, could include fully or otherwise-connected neurons, could include recurrent and/or feed-forward connections between neurons in different layers, could include filters or other elements to process input information and/or information passing between layers, or could be configured in some other way to facilitate the generation of predicted color palettes based on input images.

An ANN used to generate a predicted color palette based on an input image could include one or more filters that could be applied to the input image and the outputs of such filters could then be applied to the inputs of one or more neurons of the ANN. For example, such an ANN could be or could include a convolutional neural network (CNN). Convolutional neural networks are a variety of ANNs that are configured to facilitate ANN-based classification or other processing based on images or other large-dimensional inputs whose elements are organized within two or more dimensions. The organization of the ANN along these dimensions may be related to some structure in the input structure (e.g., as relative location within the two-dimensional space of an image can be related to similarity between pixels of the image).

In example embodiments, a CNN includes at least one two-dimensional (or higher-dimensional) filter that is applied to an input image; the filtered input image is then applied to neurons of the CNN (e.g., of a convolutional layer of the CNN). The convolution of such a filter and an input image could represent the color values of a pixel or a group of pixels from the input image. A set of neurons of a CNN could receive respective inputs that are determined by applying the same filter to an input image. Additionally or alternatively, a set of neurons of a CNN could be associated with respective different filters and could receive respective inputs that are determined by applying the respective filter to the input image. Such filters could be trained during training of the CNN or could be pre-specified. For example, such filters could represent wavelet filters, center-surround filters, biologically-inspired filter kernels (e.g., from studies of animal visual processing receptive fields), or some other pre-specified filter patterns.

A CNN or other variety of ANN could include multiple convolutional layers (e.g., corresponding to respective different filters and/or features), pooling layers, rectification layers, fully connected layers, or other types of layers. Convolutional layers of a CNN represent convolution of an input image, or of some other input (e.g., of a filtered, downsampled, or otherwise-processed version of an input image), with a filter. Pooling layers of a CNN apply nonlinear downsampling to higher layers of the CNN, e.g., by applying a maximum, average, L2-norm, or other pooling function to a subset of neurons, outputs, or other features of the higher layer(s) of the CNN. Rectification layers of a CNN apply a rectifying nonlinear function (e.g., a nonsaturating activation function, a sigmoid function) to outputs of a higher layer. Fully connected layers of a CNN receive inputs from many or all of the neurons in one or more higher layers of the CNN. The outputs of neurons of one or more fully connected layers (e.g., a final layer of an ANN or CNN) could be used to determine the predicted color palette of areas of an input image (e.g., for each of the pixels of an input image) or for the image as a whole.

Neurons in a CNN can be organized according to corresponding dimensions of the input. For example, where the input is an image (a two-dimensional input, or a three-dimensional input where the color channels of the image are arranged along a third dimension), neurons of the CNN (e.g., of an input layer of the CNN, of a pooling layer of the CNN) could correspond to locations in the two-dimensional input image. Connections between neurons and/or filters in different layers of the CNN could be related to such locations. For example, a neuron in a convolutional layer of the CNN could receive an input that is based on a convolution of a filter with a portion of the input image, or with a portion of some other layer of the CNN, that is at a location proximate to the location of the convolutional-layer neuron. In another example, a neuron in a pooling layer of the CNN could receive inputs from neurons, in a layer higher than the pooling layer (e.g., in a convolutional layer, in a higher pooling layer), that have locations that are proximate to the location of the pooling-layer neuron.

An ANN could generate, based on an input image, a color palette whose colors can be used to represent, using fewer colors, the relatively larger number of colors present in the input image. Such a color palette may be used to reduce the color depth of the input image or otherwise quantize the input image, allowing the input image to be represented by fewer bits (e.g., to accomplish compression of the input image) or to provide some other benefit (e.g., to allow the image to be displayed on a low color depth display). Such a color palette can be used to convert the input image into a specified image format, with a color range that corresponds to the size of the generated color palette. In some examples, this could include the ANN generating a color palette having a number of colors corresponding to a number of colors permitted by a particular image format, e.g., the GIF or PNG image formats.

A variety of methods may be used to apply the generated color palette to convert the input image into a reduced-color depth image that only includes colors of the color palette. Such a process may be performed in order to convert the input image into a format that supports the limited number of colors in the generated color palette. This may be done by selecting, for each pixel of the input image, a color from the generated color palette to represent the corresponding pixel in the converted image. For example, selecting a color from the color palette for a particular pixel may include determining distances, in a three-dimensional color space, between the color of the particular pixel and each of the colors in the color palette. The color in the color palette having the lowest distance could then be selected for the particular pixel.

III. Example Training Methods

An encoder (e.g., that is part or all of a CNN and/or other variety of ANN) or other algorithm used to generate color palettes from images can be trained to improve the quality of the color palettes generated thereby. This training can include iteratively or otherwise updating the encoder based on a set of training images. Such training could include applying a particular training image to the encoder, determining an output color palette, generating a quantized version of the input using the color palette, and then determining an error or loss based on a degree of correspondence between the quantized image generated and the input image (e.g., a mean squared difference between the color of pixels of the input image and the color of corresponding pixels of the quantized image). The encoder can then be updated (e.g., via backpropagation) based on the determined degree of correspondence.

Such an "unsupervised" training method can provide benefits relative to "supervised" methods wherein the encoder is trained based on the correspondence between generated color palettes and known "ground truth" color palettes. In practice, it can be difficult or expensive (in terms of human effort) to access such "ground truth" color palette information. Further, where such "ground truth" color palettes are generated by a human, the "ground truth" palettes may, themselves, be suboptimal (e.g., biased by the human's subjective perception of the images) in a manner that can be difficult to correct.

The methods described herein can improve the above shortcomings by facilitating the training of encoders based on the differences (e.g., pixel-wise differences) between source images and quantized imaged generated therefrom according to color palettes generated from the source image. This allows a great many different images to be used to train the encoder. Additionally, the training can result in encoders that will attempt to create color palettes that result in quantized images that correspond to the source images, rather than including some bias within the color space of the color palette.

Sets of images or other image information could be acquired, as described herein, for a plurality of different scenes, perspectives, and/or colors thereof in order to generate a plurality of images for training an encoder. Sets of images or other image information used to train an encoder could be acquired in a variety of ways. In some examples, one or more images of the training set could be augmented to increase the variety of images and image types present in the set of training images. This can include intentionally adding noise, changing the color balance, introducing simulated scratches, streaks, or other imperfections, or introducing some other abnormalities into one or more of the training images. This could be done many ways such as, having pixels be the incorrect color (e.g., a black colored pixel in a blue sky image), having multiple pixels be the incorrect color (e.g., a row of white pixels crossing over different colored columns), out-of-focus or "blurry" image, cropped images (e.g., rows and/or columns of pixels removed from the image), and/or images in monochrome (e.g., images in grayscale).

FIG. 1 shows an example flowchart illustrating elements of such an encoder training method. A plurality of images ("TRAINING IMAGE SET") includes an example source image ("SOURCE IMAGE").

An encoder ("ENCODER"), e.g., an ANN, a CNN, or some other encoder algorithm, is used to determine a color palette ("COLOR PALETTE") based on the source image. The encoder could be configured in a variety of ways (e.g., as described above) to provide a color palette based on an input image. For example, the encoder could include a convolutional neural network. An algorithm for using the generated color palette to convert the source image into a reduced color depth quantized image ("QUANTIZER") is then used to generate the quantized image ("QUANTIZED IMAGE") based on the color palette. Thus, the quantized image represents a version of the source image whose pixels are restricted to the colors represented in the color palette output by the encoder.

Differences between the quantized image and the source image can be determined ("ERROR SIGNAL") and used to update the encoder. Such determined differences could include a difference image determined by, e.g., subtracting the values of corresponding pixels between the quantized image and the source image. Updating the encoder can include applying a loss function to the determined differences between the quantized image and the source image, performing backpropagation, determining a gradient of the differences with respect to coefficients of the encoder, or updating the encoder, based on the determined differences, according to some other method. In some examples, the loss function could include one or more terms related to a subjective quality of the quantized image. Such a subjective quality value could be provided, e.g., by a human who has viewed the quantized image. Additionally or alternatively, a convolutional neural network or other algorithm or model could be applied to the quantized image to generate such a subjective quality score. For example, the Neural Image Assessment (NIMA) could be applied to the quantized image to generate a subjective quality score.

The processes described above for updating an encoder (e.g., in connection with FIG. 1) could be performed a plurality of times to train an encoder. For example, the processes could be performed iteratively until the encoder converges (e.g., until the degree of change in the encoder coefficients in each iteration reduces below a specified absolute or relative level), until a measure of the magnitude of the determined error signals (e.g., a sum of squared errors, a sum of rectified errors, subjective quality score) in each iteration reduces below a specified absolute or relative level, for a specified number of iterations, or according to some other condition.

Yet further, the embodiments described in connection with FIG. 1 are intended as illustrative example embodiments and are not intended to be limiting. For example, a plurality of images used to train an encoder could include a plurality of sets of images corresponding to respective different subjects. Each such set of images could include one or more all-in-focus images, shallow depth-of-field images, or other images that could be used to perform one or more elements of the encoder training methods described herein. In such examples, the encoder could be trained such that the color palettes for each image in such a set of images is similar.

An encoder could be trained according to the techniques described herein by a server, cloud computing service, or other computing system. The system used to train the encoder could then apply the trained encoder to determine color palettes for further images. For example, the system could receive additional images (e.g., from a cell phone, digital camera, or other image-capturing system) and apply the trained encoder to such images to generate color palettes for such images, to use such generated color palettes to generate reduced color depth quantized versions of such images (e.g., as part of a process to encode the images according to the GIF, PNG, or some other image format), or to perform some other operations related to the image and/or the color palette generated therefrom. The system could then transmit the determined color palette, quantized version of the image, or other generated information to whatever device or system provided the additional image(s).

Additionally or alternatively, a server or other system could train an encoder as described herein and then transmit an indication of the trained encoder (e.g., an indication of the coefficients, internal structure, or other specifics of the trained encoder) to some other system. The other system could then operate to apply the trained encoder to additional images. For example, a server could train an encoder as described herein and then transmit an indication of the trained encoder to a cell phone (e.g., via the internet and/or a cellular data network). The cell phone could then operate to apply the trained encoder to images (e.g., images captured via a camera of the cell phone) to generate color palettes, quantized version of the images using such color palettes, or other processes using the trained encoder. Transmitting an indication of a trained encoder could include transmitting information, via wired or wireless components, to an already-operating system (e.g., to a cell phone, digital camera, or other device in communication with the internet). Additionally or alternatively, transmitting an indication of a trained encoder to a system could occur during assembly and/or programming of the system. For example, transmitting an indication of a trained encoder could include programming a controller or memory (e.g., a flash memory or some other non-transitory computer-readable medium) with the trained encoder and subsequently integrating the controller or memory into a device or other system.

Note that, while the images used to train encoder as described herein may be characterized as "training data" or "training images" used to train an encoder for later application to further images of interest (e.g., images captured by a cell phone), these characterizations are intended as non-limiting examples of the methods described herein. An ANN may be trained using one or more images and then used to generate a color palette for the one or more images again, after it has been trained using the images.

IV. Illustrative Systems

Figure 2:
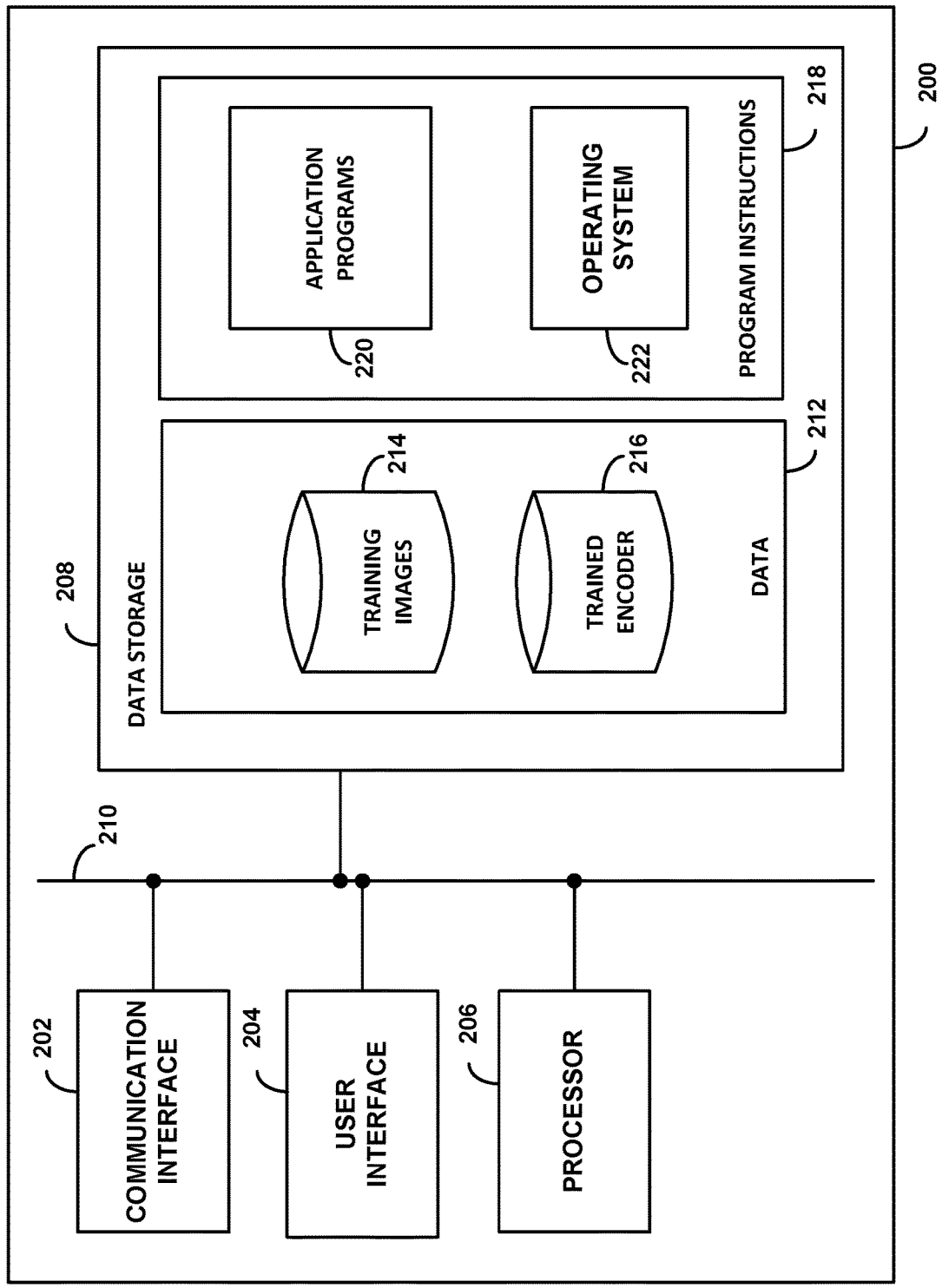
FIG. 2 is a simplified block diagram showing some of the components of an example computing system.

FIG. 2 illustrates an example computing device 200 that may be used to implement the methods described herein. By way of example and without limitation, computing device 200 may be a cellular mobile telephone (e.g., a smartphone), a still camera, a video camera, a fax machine, a computer (such as a desktop, notebook, tablet, or handheld computer), a personal digital assistant (PDA), a home automation component, a digital video recorder (DVR), a digital television, a remote control, a wearable computing device, a robot, a drone, an autonomous vehicle, or some other type of device. Such a device may be equipped with an image capture device so as to generate one or more images that may then be compressed and/or quantized according to the methods described herein (e.g., to generate a reduced-color depth or otherwise quantized output image). It should be understood that computing device 200 may represent a physical camera device such as a digital camera, a particular physical hardware platform on which an image processing application operates in software, or other combinations of hardware and software that are configured to carry out image processing and/or encoder training functions.

As shown in FIG. 2, computing device 200 may include a communication interface 202, a user interface 204, a processor 206, and data storage 208, all of which may be communicatively linked together by a system bus, network, or other connection mechanism 210.

Communication interface 202 may function to allow computing device 200 to communicate, using analog or digital modulation of electric, magnetic, electromagnetic, optical, or other signals, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wifi interface, a BLUETOOTH® interface, and a wide-area wireless interface).

In some embodiments, communication interface 202 may function to allow computing device 200 to communicate, with other devices, remote servers, access networks, and/or transport networks. For example, the communication interface 202 may function to access a trained encoder via communication with a remote server or other remote device or system in order to allow the computing device 200 to use the trained encoder to generate color palettes based on captured or otherwise obtained images and/or to use such color palettes to quantize such images. For example, the computing system 200 could be a cell phone, digital camera, or other image capturing device and the remote system could be a server containing a memory containing such a trained encoder.

User interface 204 may function to allow computing device 200 to interact with a user, for example to receive input from and/or to provide output to the user. Thus, user interface 204 may include input components such as a keypad, keyboard, touch-sensitive or presence-sensitive panel, computer mouse, trackball, joystick, microphone, and so on. User interface 204 may also include one or more output components such as a display screen which, for example, may be combined with a presence-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices.

Processor 206 may comprise one or more general purpose processors—e.g., microprocessors—and/or one or more special purpose processors—e.g., digital signal processors (DSPs), graphics processing units (GPUs), floating point units (FPUs), network processors, tensor processing units (TPUs), or application-specific integrated circuits (ASICs). In some instances, special purpose processors may be capable of image processing, image alignment, and merging images, among other applications or functions. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing device 200, cause computing device 200 to carry out any of the methods, processes, or functions disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, encoder and/or ANN training, image-based color palette generation) installed on computing device 200. Data 212 may include training images 214 and/or one or more trained encoders 216. Training images 214 may be used to train an ANN or other encoder or encoder-containing algorithm as described herein (e.g., to generate and/or update the trained encoder 216). The trained encoder 216 may be applied to generate color palettes based on input images (e.g., images captured using camera components of the device 200 and/or accessed via the communication interface 202).

Application programs 220 may communicate with operating system 222 through one or more application programming interfaces (APIs). These APIs may facilitate, for instance, application programs 220 reading and/or writing a trained encoder 216, transmitting or receiving information via communication interface 202, receiving and/or displaying information on user interface 204, capturing images using camera components 224, and so on.

Application programs 220 may take the form of "apps" that could be downloadable to computing device 200 through one or more online application stores or application markets (via, e.g., the communication interface 202). However, application programs can also be installed on computing device 200 in other ways, such as via a web browser or through a physical interface (e.g., a USB port) of the computing device 200.

V. Example Methods

Figure 3:
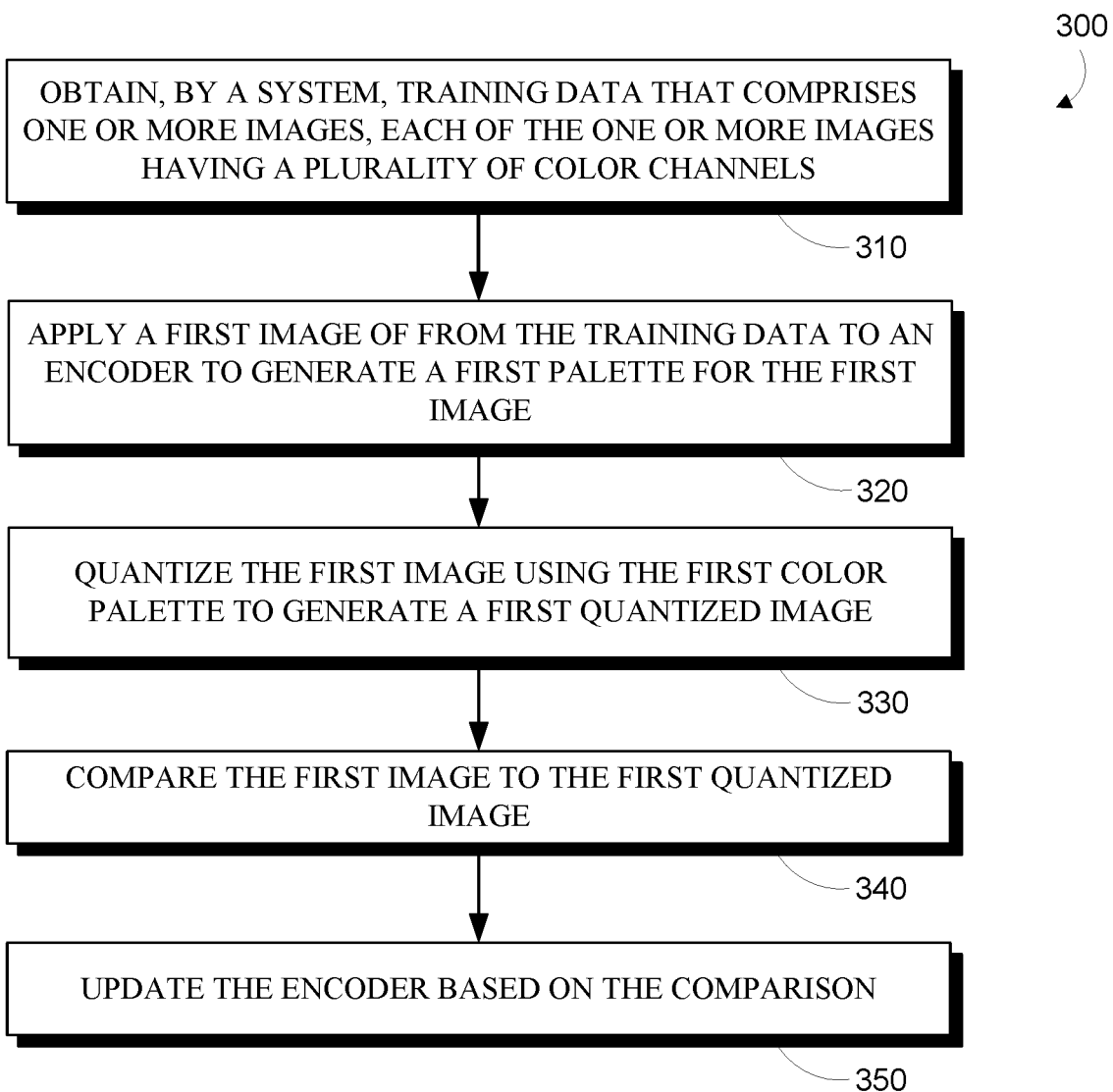
FIG. 3 is a flowchart of a method.

FIG. 3 is a flowchart of a method 300 for training an encoder to generate a color palette from an input image. The method 300 includes obtaining, by a system, training data that comprises one or more images (310), where each of the one or more images includes a plurality of color channels. The method 300 additionally includes applying a first image from the training data to an encoder to generate a first palette for the first image (320). The first palette comprises a first number of colors and each color of the first palette comprises a set of values that correspond to respective color channels of the first image. The method 300 additionally includes quantizing the first image using the first color palette to generate a first quantized image (330). The method 300 additionally includes comparing the first image to the first quantized image (340). The method 300 additionally includes updating the encoder based on the results of the comparison (350).

These embodiments could include additional elements or features. In some embodiments, the first image is an RGB image that has a red color channel, a blue color channel, and a green color channel.

In some embodiments, the first image is modified through data augmentation before applying the first image to the encoder. For example, the first image may be augmented by introducing abnormalities into the image, such as, but not limited to, adding noise, changing the color balance, and applying simulated scratches or other simulated defects. In some examples, the first image may be augmented by applying out-of-focus subjects and/or by changing the blur or focus of portions of the image, adding light glare, and creating corrupted pixels.

In some embodiments, the encoder comprises one or more convolutional layers and one or more output layers. At least one of the output layers receives, as an input, an output of at least one of the convolutional layers. One or more of such output layers could, alternatively, be called 'hidden layers.' Applying the first image to the encoder to generate the first palette comprises applying the first image to at least one of the convolutional layers. A final layer of the one or more output layers includes a first number of output units and each output unit of the final layer corresponds to a respective color of the first palette.

In some embodiments, the method further includes generating a reduced-palette encoder by modifying the updated encoder. Modifying the updated encoder includes discarding, from the updated encoder, at least the final layer and replacing the discarded final layer with a reduced-palette final layer. The reduced-palette final layer includes a second number of output units, wherein the second number of output units is less than the first number of output units. Modifying the updated encoder additionally includes applying a second image from the training data to the reduced-palette encoder to generate a second palette for the second image, wherein the second palette comprises a second number of colors, each color of the second palette comprising a set of values that correspond to respective color channels of the second image, wherein the second number of colors is less than the first number of colors, and wherein each output unit of the reduced-palette final layer corresponds to a respective color of the second palette. Modifying the updated encoder yet further includes quantizing the second image using the second palette to generate a second quantized image. Modifying the updated encoder still further includes comparing the second image to the second quantized image. Modifying the encoder additionally includes updating the reduced-palette encoder based on the comparison of the second image to the second quantized image.

In some embodiments, the first number of colors is greater than 255 and the second number of colors is less than 65. In some embodiments, the first number of colors is greater than 1023 and the second number of colors is less than 255. In some embodiments, the first number of colors is greater than 127 and the second number of colors is less than 32.

In some embodiments, updating the reduced-palette encoder comprises updating at least one parameter of the reduced-palette final layer.

In some embodiments, updating the reduced-palette encoder comprises not modifying any parameter of the one or more convolutional layers. That is, updating the reduced-palette encoder can include leaving the parameters of the convolutional layers un-altered, changing only the parameters, number of nodes, structure of connection, or other properties of the reduced-palette final layer. This could include taking some positive action so as not to modify any parameter of the one or more convolutional layers, e.g., fixing the one or more convolutional layers and/or parameters thereof by setting a learning rate parameter for the convolutional layers to zero, by setting a flag to indicate that the convolutional layers could be fixed or otherwise not updated, or by taking some other action to prevent the parameters of the one or more convolutional layers from being modified when updated to the reduced-palette encoder.

In some embodiments, comparing the first image to the first quantized image comprises determining a difference between a particular pixel of the first input image and a corresponding pixel of the first quantized image. For example, a sum of squared differences between each pair of pixels in the first image and first quantized image could be determined.

In some embodiments, comparing the first image to the first quantized image comprises applying a convolutional neural network to the first quantized image to generate a subjective quality source. This could include using a Neural Image Assessment (NIMA) deep convolutional neural network to determine a subjective quality score that is predictive of whether a typical human viewer of the first quantized image would find the first quantized image subjectively pleasing.

In some embodiments, the encoder is differentiable end-to-end and updating the encoder comprises performing backpropagation through the encoder. For example, a calculated difference between a pixel of the first image and a corresponding pixel of the first quantized image could be back-propagated through the encoder and used to update one or more parameters of the encoder, possibly in combination with one or more other calculated differences that have been backpropagated through the encoder. This is an improvement over other quantization methods (e.g., the median-cut algorithm) that may be iterative or that may have other properties that prevent end-to-end differentiation. Accordingly, it may be difficult or impossible to train such other algorithms via effective, computationally tractable methods like backpropagation or other training algorithms that rely on end-to-end differentiability of elements of an encoder or other algorithm to be trained. Furthermore, because the encoder is end-to-end differentiable, it can be easily connected to other learning systems and, in particular, can be included as a modular component in any differentiable learning system.

In some embodiments, the comparing the first image to the first quantized image comprises performing a comparison process that is differentiable end-to-end and updating the encoder comprises performing backpropagation through the comparison process.

Figure 4:
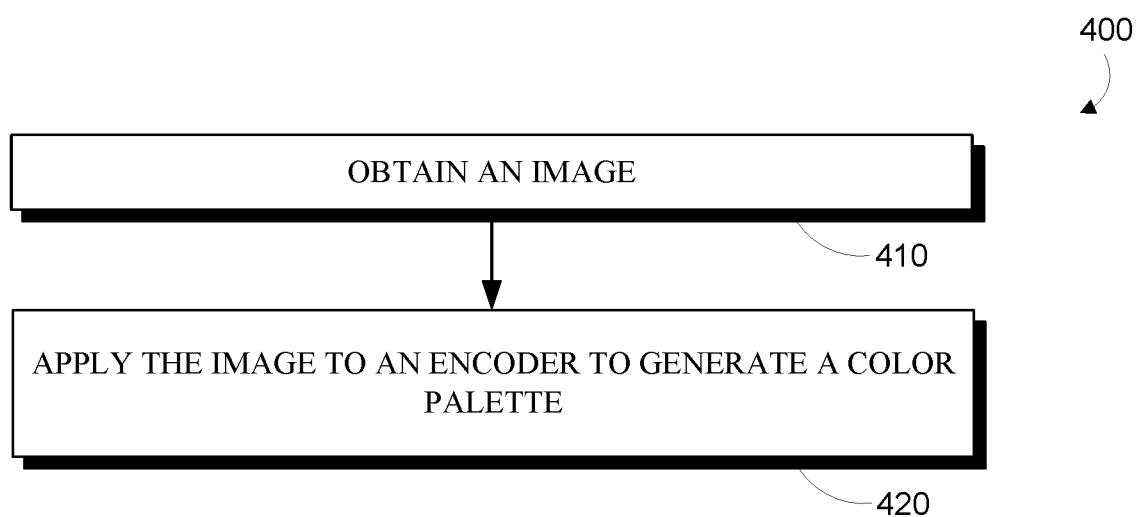
FIG. 4 is a flowchart of a method.

FIG. 4 is a flowchart of a method 400 for predicting a color palette for an image. The method 400 includes obtaining an image (410). The method 400 additionally includes applying the image to an encoder, trained according to the method 300 above, to generate a palette for the image (420).

These embodiments could include additional elements or features. In some embodiments, the image is an RGB image file. In some embodiments, the method 400 includes using the generated palette to determine a reduce-color depth or otherwise quantized image from the obtained image. This quantization process could be performed in accordance with an image format, e.g., in accordance with the GIF image format.

VI. Conclusion

The above detailed description describes various features and functions of the disclosed systems, devices, and methods with reference to the accompanying figures. In the figures, similar symbols typically identify similar components, unless the context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flowcharts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

While example embodiments throughout have included the use of ANNs to generate color palettes based on input images, it is anticipated that alternative algorithms could be applied to generate color palettes based on images. For example, kernel methods, Bayesian inferential algorithms, reinforcement learning algorithms, cellular automata, decision trees, boosted decision trees, or other alternative algorithms and/or combinations thereof could be applied, according to the methods described herein, to generate color palettes based on input images. Correspondingly, the methods described herein for training ANNs could be applied to train such alternative algorithms, e.g., by providing error information (e.g., differences between input images and images generated by applying a generated reduced color depth color palette thereto) that can be applied to update such alternative algorithms (e.g., using backpropagation, reinforcement learning, or some other technique appropriate for the chosen alternative algorithm).

We claim:

1. A method for training an encoder to generate a color palette from an input image, the method comprising:
    obtaining training data, wherein the training data comprises one or more images, wherein each of the one or more images has a plurality of color channels;
    applying a first image from the training data to an encoder to generate a first palette for the first image, wherein the first palette comprises a first number of colors, each color of the first palette comprising a set of values that correspond to respective color channels of the first image, wherein the encoder comprises one or more output layers, wherein a final layer of the one or more output layers includes a first number of output units, and wherein each output unit of the final layer corresponds to a respective color of the first palette;
    quantizing the first image using the first palette to generate a first quantized image;
    comparing the first image to the first quantized image;
    updating the encoder based on the comparison; and
    generating a reduced-palette encoder by modifying the updated encoder, wherein modifying the updated encoder comprises:
        discarding, from the updated encoder, at least the final layer; and
        replacing the discarded final layer with a reduced-palette final layer, wherein the reduced-palette final layer includes a second number of output units, wherein the second number of output units is less than the first number of output units.

2. The method of claim 1, wherein the first image is an RGB image that has a red color channel, a blue color channel, and a green color channel.

3. The method of claim 1, wherein the first image is modified through data augmentation before applying the first image to the encoder.

4. The method of claim 1, further comprising:
    applying a second image from the training data to the reduced-palette encoder to generate a second palette for the second image, wherein the second palette comprises a second number of colors, each color of the second palette comprising a set of values that correspond to respective color channels of the second image, wherein the second number of colors is less than the first number of colors, and wherein each output unit of the reduced-palette final layer corresponds to a respective color of the second palette;
    quantizing the second image using the second palette to generate a second quantized image;
    comparing the second image to the second quantized image; and
    updating the reduced-palette encoder based on the comparison of the second image to the second quantized image.

5. The method of claim 4, wherein the first number of colors is greater than 255 and wherein the second number of colors is less than 65.

6. The method of claim 4, wherein updating the reduced-palette encoder comprises updating at least one parameter of the reduced-palette final layer.

7. The method of claim 4, wherein the encoder further comprises one or more convolutional layers, and wherein parameters of the one or more convolutional layers are fixed during updating the reduced-palette encoder.

8. The method of claim 1, wherein comparing the first image to the first quantized image comprises determining a difference between a particular pixel of the first input image and a corresponding pixel of the first quantized image.

9. The method of claim 1, wherein comparing the first image to the first quantized image comprises applying a convolutional neural network to the first quantized image to generate a subjective quality score.

10. The method of claim 9, wherein applying a convolutional neural network to the first quantized image to generate a subjective quality score comprises using the Neural Image Assessment (NIMA).

11. The method of claim 1, wherein the encoder is differentiable end-to-end and wherein updating the encoder comprises performing backpropagation through the encoder.

12. The method of claim 11, wherein comparing the first image to the first quantized image comprises performing a comparison process that is differentiable end-to-end and wherein updating the encoder comprises performing backpropagation through the comparison process.

13. A method for predicting a color palette for an image, the method comprising:
obtaining an image;
applying the image to an encoder to generate, for the image, at least one palette, wherein the encoder has been trained according to the method of claim 1.

14. The method of claim 13, wherein the image is an RGB image file.

15. The method of claim 13, further comprising converting the image to a reduced-color depth image by:
selecting, for each pixel of the image, a color from the generated palette to represent the corresponding pixel in the reduced-color depth image; and
storing each selected color in association with the corresponding pixel.

16. A non-transitory computer-readable medium, having stored thereon program instructions that, upon execution by a computing device, cause the computing device to perform a method comprising:
obtaining training data, wherein the training data comprises one or more images, wherein each of the one or more images has a plurality of color channels;
applying a first image from the training data to an encoder to generate a first palette for the first image, wherein the first palette comprises a first number of colors, each color of the first palette comprising a set of values that correspond to respective color channels of the first image, wherein the encoder comprises one or more output layers, wherein a final layer of the one or more output layers includes a first number of output units, and wherein each output unit of the final layer corresponds to a respective color of the first palette;
quantizing the first image using the first palette to generate a first quantized image;
comparing the first image to the first quantized image;
updating the encoder based on the comparison; and
generating a reduced-palette encoder by modifying the updated encoder, wherein modifying the updated encoder comprises:
discarding, from the updated encoder, at least the final layer; and
replacing the discarded final layer with a reduced-palette final layer, wherein the reduced-palette final layer includes a second number of output units, wherein the second number of output units is less than the first number of output units.

17. The non-transitory computer readable medium of claim 16, wherein the method further comprises:

applying a second image from the training data to the reduced-palette encoder to generate a second palette for the second image, wherein the second palette comprises a second number of colors, each color of the second palette comprising a set of values that correspond to respective color channels of the second image, wherein the second number of colors is less than the first number of colors, and wherein each output unit of the reduced-palette final layer corresponds to a respective color of the second palette;
quantizing the second image using the second palette to generate a second quantized image;
comparing the second image to the second quantized image; and
updating the reduced-palette encoder based on the comparison of the second image to the second quantized image.

18. A system comprising:
a controller; and
a non-transitory computer-readable medium, having stored thereon program instructions that, upon execution by the controller, cause the controller to perform a method comprising:
obtaining training data, wherein the training data comprises one or more images, wherein each of the one or more images has a plurality of color channels;
applying a first image from the training data to an encoder to generate a first palette for the first image, wherein the first palette comprises a first number of colors, each color of the first palette comprising a set of values that correspond to respective color channels of the first image, wherein the encoder comprises one or more output layers, wherein a final layer of the one or more output layers includes a first number of output units, and wherein each output unit of the final layer corresponds to a respective color of the first palette;
quantizing the first image using the first palette to generate a first quantized image;
comparing the first image to the first quantized image;
updating the encoder based on the comparison; and
generating a reduced-palette encoder by modifying the updated encoder, wherein modifying the updated encoder comprises:
discarding, from the updated encoder, at least the final layer; and
replacing the discarded final layer with a reduced-palette final layer, wherein the reduced-palette final layer includes a second number of output units, wherein the second number of output units is less than the first number of output units.

19. The system of claim 18, wherein the method further comprises:
applying a second image from the training data to the reduced-palette encoder to generate a second palette for the second image, wherein the second palette comprises a second number of colors, each color of the second palette comprising a set of values that correspond to respective color channels of the second image, wherein the second number of colors is less than the first number of colors, and wherein each output unit of the reduced-palette final layer corresponds to a respective color of the second palette;
quantizing the second image using the second palette to generate a second quantized image;
comparing the second image to the second quantized image; and updating the reduced-palette encoder based on the comparison of the second image to the second quantized image.

\* \* \* \* \*